(12) United States Patent
Berman et al.

(10) Patent No.: US 12,478,778 B2
(45) Date of Patent: Nov. 25, 2025

(54) HYDROGEL-BASED BIOMEDICAL DEVICES FOR THERAPEUTIC HYDROGEN TREATMENT OF SKIN AND TISSUES AND METHODS OF USING THEM

(71) Applicant: MAG AND BIO DYNAMICS INC., Granbury, TX (US)

(72) Inventors: Diana Berman, Denton, TX (US); Jihyung Lee, Denton, TX (US); Vladimir Safonov, Granbury, TX (US); Donghui Zhu, Frisco, TX (US); Marina Safonov, Granbury, TX (US)

(73) Assignee: MAG AND BIO DYNAMICS INC., Granbury, TX (US)

( * ) Notice: Subject to any disclaimer, the term of this patent is extended or adjusted under 35 U.S.C. 154(b) by 981 days.

(21) Appl. No.: 16/523,826

(22) Filed: Jul. 26, 2019

(65) Prior Publication Data
US 2020/0030598 A1    Jan. 30, 2020

Related U.S. Application Data

(60) Provisional application No. 62/703,680, filed on Jul. 26, 2018.

(51) Int. Cl.
| | | |
|---|---|---|
| *A61N 1/04* | (2006.01) | |
| *A61K 9/00* | (2006.01) | |
| *A61K 33/00* | (2006.01) | |
| *A61K 33/40* | (2006.01) | |
| *A61K 47/36* | (2006.01) | |
| *A61L 26/00* | (2006.01) | |
| *A61M 37/00* | (2006.01) | |
| *A61P 17/02* | (2006.01) | |

(52) U.S. Cl.
CPC .......... *A61N 1/0496* (2013.01); *A61K 9/0014* (2013.01); *A61K 33/00* (2013.01); *A61K 33/40* (2013.01); *A61K 47/36* (2013.01); *A61L 26/0023* (2013.01); *A61L 26/008* (2013.01); *A61M 37/00* (2013.01); *A61N 1/0416* (2013.01); *A61P 17/02* (2018.01); *A61M 2037/0007* (2013.01)

(58) Field of Classification Search
CPC .. A61N 1/0496; A61N 1/0416; A61N 1/0428; A61N 1/303; A61K 9/0014; A61K 33/00; A61K 33/40; A61K 47/36; A61K 9/06; A61K 47/32; A61L 26/0023; A61L 26/008; A61L 15/42; A61L 15/44; A61L 15/46; A61L 15/60; A61M 37/00; A61M 2037/0007; A61P 17/02
See application file for complete search history.

(56) References Cited

U.S. PATENT DOCUMENTS

| | | | |
|---|---|---|---|
| 5,354,264 A * | 10/1994 | Bae | A61M 5/155 604/21 |
| 6,352,715 B1 | 3/2002 | Hwang et al. | |
| 8,449,908 B2 | 5/2013 | Stinchcomb et al. | |
| 8,852,660 B2 | 10/2014 | Miljkovic | |
| 9,144,581 B2 | 9/2015 | Miljkovic | |
| 9,238,012 B2 | 1/2016 | Hiraoka et al. | |
| 9,962,340 B2 | 5/2018 | Weimann | |
| 10,016,486 B1 | 7/2018 | Pyun et al. | |
| 10,071,090 B2 | 9/2018 | Stinchcomb et al. | |
| 10,076,540 B1 | 9/2018 | Perricone | |
| 10,272,125 B2 | 4/2019 | Weimann | |
| 11,364,261 B2 | 6/2022 | Safonov et al. | |
| 2003/0087427 A1* | 5/2003 | Colton | C12M 23/12 435/289.1 |
| 2007/0110676 A1 | 5/2007 | Clymer et al. | |
| 2009/0326447 A1 | 12/2009 | Joshi | |
| 2010/0152683 A1 | 6/2010 | Lindgren et al. | |
| 2010/0272789 A1 | 10/2010 | Satoh et al. | |
| 2013/0034542 A1 | 2/2013 | Ganter et al. | |
| 2013/0323190 A1 | 12/2013 | Ohta et al. | |
| 2015/0258136 A1 | 9/2015 | Lucas | |
| 2018/0092816 A1 | 4/2018 | Perricone et al. | |
| 2018/0289629 A1 | 10/2018 | Abyazani et al. | |
| 2019/0308001 A1 | 10/2019 | Safonov | |
| 2020/0030372 A1 | 1/2020 | Safonov et al. | |
| 2020/0281866 A1 | 9/2020 | Tsaur et al. | |
| 2020/0345992 A1 | 11/2020 | Safonov et al. | |
| 2021/0220185 A1 | 7/2021 | Safonov et al. | |

OTHER PUBLICATIONS

Tavsanli et al. Eur Polymer J. 2017; 94: 185-195. (Year: 2017).*
Yuvara et al. Mat Res. 2014; 17(1): 8 pages. (Year: 2014).*
Huang et al., "Recent advances in hydrogen research as a therapeutic medical gas" Free Radical Research, 2010, v 14, n 9, p. 971-982.
Ohta, "Recent Progress Toward Hydrogen Medicine: Potential of Molecular Hydrogen for Preventive and Therapeutic Applications" Current Pharmaceutical Design, 2011, v 17, 2241-2252.
Nicolson et al., "Clinical effects of hydrogen administration: from animal and human diseases to exercise medicine" Institutional Journal of Clinical Medicine, 2016, v 7, p. 32-76.
Alexander, et al., "Approaches for breaking the barriers of drug permeation through transdermal drug delivery," Journal of Controlled Release, vol. 164, pp. 26-40, 2012.
Alkilani, et al., "Transdermal Drug Delivery: Innovative Pharmaceutical Developments Based on Disruption of the Barrier Properties of the stratum corneum," Pharmaceutics, vol. 7, pp. 438-470, 2015.
Dixon, et al., "The evolution of molecular hydrogen: a noteworthy potential therapy with clinical significance," Medical Gas Research, vol. 3, No. 10, 12 pages, 2013.

(Continued)

*Primary Examiner* — David Browe
(74) *Attorney, Agent, or Firm* — Morgan, Lewis & Bockius LLP (57) ABSTRACT

Products of manufacture for delivering hydrogen, hydrogen peroxide, and/or oxygen to a tissue in need thereof comprising i) a hydrated hydrogel, and ii) at least one cathode electrode and at least one anode electrode implanted within or upon the hydrated hydrogel.

11 Claims, 9 Drawing Sheets

(56) References Cited

OTHER PUBLICATIONS

Kanehira, et al. "Controllable hydrogen release via aluminum powder corrosion in calcium hydroxide solutions," J. Asian Ceramic Societies, vol. 1, 2013: pp. 296-303.

Kobayashi, et al., "Hydrogen generation by reaction of Si nanopowder with neutral water," J Nanopart Res, vol. 19, 9 pages, 2017.

Li, et al., "Hydrogen Commonly Applicable from Medicine to Agriculture: From Molecular Mechanisms to the Field," Curr Pharm Des, vol. 27, No. 5, pp. 747-759, 2021. [Abstract].

Li, et al., "The Applications of Molecular Hydrogen in Horticulture," Horticulturae, vol. 7, No. 513, 18 pages, 2021.

Matei, et al., "Emerging mechanisms and novel applications of hydrogen gas therapy," Medical Gas Research, vol. 8, No. 3, DD. 98-102, 2018.

Mbayachi, et al., "Graphene synthesis, characterization and its applications: A review," Results in Chemistry 3 (2021) 100163.

Ostojic, "Should hydrogen therapy be included in a musculoskeletal medicine routine?" F1000 Research, vol., 5 pages, 2016.

Pastore, et al., "Transdermal patches: history, development and pharmacology," British Journal of Pharmacology, vol. 172, pp. 2179-2209, 2015.

Pereira, et al., "Traditional Therapies for Skin Wound Healing," Advances in Wound Care, vol. 5. No. 5, pp. 208-229, 2016.

Safonov, et al., "Hydrogen nanobubbles in a water solution of dietary supplement," Physicochemistry Engineering Aspects, vol. 436, 3 pages, 2013.

Shields, et al., "Still too hot: Examination of water temperature and water heater characteristics 24 years after manufacturers adopt voluntary temperature settinQs," Nat Rev Immunol, vol. 18, 2018: pp. 168-182.

Tamaki, et al., "Hydrogen-Rich Water Intake Accelerates Oral Palatal Wound Healing via Activation of the Nrf2/Antioxidant Defense Pathways in a Rat Model," Oxidative Medicine and Cellular Longevity, vol. 2016, 13 pages, 2016.

* cited by examiner

HYDROGEL-BASED BIOMEDICAL DEVICES FOR THERAPEUTIC HYDROGEN TREATMENT OF SKIN AND TISSUES AND METHODS OF USING THEM

RELATED APPLICATIONS

This application claims the benefit of priority to U.S. Provisional Patent Application Ser. No. 62/703,680 filed Jul. 26, 2018. The aforementioned application is expressly incorporated herein by reference in its entirety and for all purposes.

TECHNICAL FIELD

This invention generally relates to medical devices and tissue repair. In alternative embodiments, provided are products of manufacture and kits, and methods, for hydrogen and hydrogen peroxide generation, and for the treatment of diseases, conditions and infections responsive to exposure to a therapeutic amount of hydrogen, metastable hydrogen peroxide and/or oxygen treatment; including providing a hydrogen, metastable hydrogen peroxide and/or oxygen treatment or delivery system for cosmetic purposes.

BACKGROUND

Recent studies have demonstrated benefits of hydrogen as a natural antioxidant, and for enhancing treatment of skin, e.g., a wounded skin, bruises, insect bites, cosmetic issues, and other health conditions. The traditional approach for the hydrogen delivery to the human body is through hydrogenation of drinking water or through hydrogen-rich pills. However, both pills and water are transferred to the stomach and limit direct access of hydrogen to the required areas of treatment.

SUMMARY

In alternative embodiments, provided are products of manufacture capable of delivering a therapeutically effective amount of hydrogen, metastable hydrogen peroxide and/or oxygen to a tissue in need thereof, the product of manufacture comprising:
(a) a hydrated hydrogel, and
(b) at least one cathode electrode and at least one anode electrode implanted within or upon the hydrogel, wherein the cathode and the anode electrode are spaced sufficiently apart to generate an electrical current in the hydrogel sufficient to cause a hydrolysis reaction in the hydrogel, thereby generating the hydrogen, metastable hydrogen peroxide and oxygen,
and optionally (c), a power source operatively linked to the at least one cathode electrode and at least one anode electrode able to generate a current sufficient to cause a hydrolysis reaction in the hydrogel.

In alternative embodiments, the hydrogel comprises a glycosaminoglycan, an anionic glycosaminoglycan, or an anionic non-sulfated glycosaminoglycan, wherein optionally the glycosaminoglycan comprises a hyaluronic acid, and optionally the hydrogel is at least about 75%, 80% or 85% wt (by weight) hydrated, or is between about 70% and 90% wt (by weight) hydrated.

In alternative embodiments, the hydrogel comprises a crosslinked polyethylene oxide, a crosslinked poly(2-acrylamido-2-methyl-1-propanesulfonic acid) or poly AMPS, a crosslinked polyvinylpyrrolidone, a polyvinyl alcohol, a sodium polyacrylate, an acrylate polymer, an agarose or a cellulose, optionally a methylcellulose, and optionally the hydrogel is at least about 85%, 90% or 95% hydrated, or is between about 75% to 100%, or 80% to 98%, or 85% to 95% hydrated, or is 100% hydrated.

In alternative embodiments, the cathode and the anode electrode are spaced 0.25 to 4 cm, 0.5 to 3 cm, or 1 to 2 cm, apart; or, the cathode and the anode electrode are made of a material comprising a conductive material, optionally a flexible conductive material, and optionally the conductive material comprises a graphite or a metal, wherein optionally the metal comprises platinum or gold.

In alternative embodiments, the products of manufacture are fabricated in the form of a pad, a dressing or a patch.

In alternative embodiments, the products of manufacture comprise, or further comprise, a power source operatively linked to the at least one cathode electrode and at least one anode electrode, wherein optionally the power source comprises a battery or a microbattery, wherein optionally the battery or microbattery can deliver a current of between about 1 µA to $10^3$ µA.

In alternative embodiments, the products of manufacture comprise, or further comprise, a flexible supportive material, and optionally the hydrogel is completely or partially encased in or is supported by the flexible supportive material, and optionally the flexible supportive material comprises an acrylic, a nylon or a polyester.

In alternative embodiments, provided are methods for treating or ameliorating, or accelerating the healing of, or slowing the progression of, or lessening the symptoms of, a wound, a disease or a condition response to administration of a therapeutically effective amount of hydrogen, metastable hydrogen peroxide and/or oxygen, the method comprising: topically administering to a tissue or skin in need thereof a product of manufacture of any of the preceding claims,
wherein optionally the wound, disease or condition response to administration of a therapeutically effective amount of hydrogen, metastable hydrogen peroxide and/or oxygen comprises or is: a wound, a granuloma, an ulcer (optionally a diabetic ulcer), a burn, a skin condition (optionally the skin condition is a dermatitis or eczema), or a cancer (optionally the cancer is a melanoma or a carcinoma),
and optionally the condition comprises a cosmetic condition, and the product of manufacture is applied for cosmetic purposes, wherein optionally the cosmetic purposes comprise application for removal, treatment of or amelioration of bruises, acne, scars and/or unwanted pigmentation.

In alternative embodiments, the wound, a disease or a condition response to administration of a therapeutically effective amount of hydrogen, metastable hydrogen peroxide and/or oxygen is: an autoimmune disease or a condition of the skin or mucosa, and optionally the autoimmune disease or a condition of the skin or mucosa is: alopecia, urticaria, pemphigoid (optionally, bullous pemphigoid or cicatricial pemphigoid), pemphigus (optionally, pemphigus vulgaris), lupus eythematosus, erythema (optionally, erythema nodosum) lichen planus or lichen sclerosus, psoriasis, scleroderma, or vitiligo.

In alternative embodiments, provided are kits comprising: a product of manufacture of any of the preceding claims, and optionally comprising instructions for practicing a method of any of the preceding claims, wherein optionally the kit further comprises leads for connecting the at least one cathode electrode and at least one anode electrode to an external power source if the product of manufacture does not contain its own internal power source, wherein optionally the kit further comprises software for downloading or loading onto a phone, a computer or an equivalent device for allowing or enabling interaction between a user and the product of manufacture, and data transmission from the product of manufacture to the phone, computer or equivalent device, and presentation of the transmitted data to the user, wherein optionally the software is packaged as an "app" for the phone or equivalent device.

In alternative embodiments, provided are Uses of products of manufacture as provided herein, or a kit as provided herein, for treating or ameliorating, or accelerating the healing of, or slowing the progression of, or lessening the symptoms of, a wound, a disease or a condition response to administration of a therapeutically effective amount of hydrogen, metastable hydrogen peroxide and/or oxygen, the use comprising: topically administering to a tissue or skin in need thereof a product of manufacture of any of the preceding claims, wherein optionally the product of manufacture is fabricated in the form of a pad, a dressing or a patch, wherein optionally the wound, disease or condition response to administration of a therapeutically effective amount of hydrogen, metastable hydrogen peroxide and/or oxygen is: an autoimmune disease or a condition of the skin or mucosa, and optionally the autoimmune disease or a condition of the skin or mucosa is: alopecia, urticaria, pemphigoid (optionally, bullous pemphigoid or cicatricial pemphigoid), pemphigus (optionally, pemphigus vulgaris), lupus eythematosus, erythema (optionally, erythema nodosum) lichen planus or lichen sclerosus, psoriasis, scleroderma, or vitiligo, and optionally the condition comprises a cosmetic condition, and the product of manufacture is applied for cosmetic purposes, wherein optionally the cosmetic purposes comprise application for removal, treatment of or amelioration of bruises, acne, scars and/or unwanted pigmentation.

In alternative embodiments, provided are products of manufacture for use in treating or ameliorating, or accelerating the healing of, or slowing the progression of, or lessening the symptoms of, a wound, a disease or a condition response to administration of a therapeutically effective amount of hydrogen, metastable hydrogen peroxide and/or oxygen, a product of manufacture as provided herein, wherein optionally the product of manufacture is fabricated in the form of a pad, a dressing or a patch, wherein optionally the wound, disease or condition response to administration of a therapeutically effective amount of hydrogen, metastable hydrogen peroxide and/or oxygen is: an autoimmune disease or a condition of the skin or mucosa, and optionally the autoimmune disease or a condition of the skin or mucosa is: alopecia, urticaria, pemphigoid (optionally, bullous pemphigoid or cicatricial pemphigoid), pemphigus (optionally, pemphigus vulgaris), lupus eythematosus, erythema (optionally, erythema nodosum) lichen planus or lichen sclerosus, psoriasis, scleroderma, or vitiligo, and optionally the condition comprises a cosmetic condition, and the product of manufacture is applied for cosmetic purposes, wherein optionally the cosmetic purposes comprise application for removal, treatment of or amelioration of bruises, acne, scars and/or unwanted pigmentation.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

DESCRIPTION OF DRAWINGS

The drawings set forth herein are illustrative of exemplary embodiments provided herein and are not meant to limit the scope of the invention as encompassed by the claims.

FIG. 1A-B schematically illustrate an exemplary product of manufacture as provided herein comprising a hyaluronic acid hydrogel:

FIG. 2A-C graphically illustrate —OH⁻ and H+ ion formation over time when an electric field is applied to an exemplary hyaluronic acid hydrogel:

Like reference symbols in the various drawings indicate like elements.

DETAILED DESCRIPTION

In alternative embodiments, provided are products of manufacture and kits, and methods, for therapeutic hydrogen delivery to a tissue in need thereof. In alternative embodiments, products of manufacture as provided herein generate hydrogen (and metastable hydrogen peroxide and oxygen) by generating an electrical current through a hydrogel contained within the products of manufacture, the electrical current resulting in a hydrolysis reaction in the hydrogel to generate hydrogen, metastable hydrogen peroxide and/or oxygen, which by proximity of the product of manufacture, which can be in the form of a patch, pad or dressing, to the tissue in need thereof (e.g., a skin or mucosa, or a wound site) delivers the hydrogen, metastable hydrogen peroxide and oxygen to the tissue (e.g., a skin or mucosa, or a wound site) in therapeutically effective amounts.

Provided here is a new concept demonstrated to be effective for locally treating or enhancing the treatment of an adverse health condition, or for a cosmetic purpose, responsive to the administration of hydrogen, metastable hydrogen peroxide and/or oxygen in therapeutically effective amounts. In alternative embodiments, the adverse health condition is a wound, such as a skin wound, a burn, or any tissue pathology or infection. Described here for the first time is a hydrogen-rich hydrogel-comprising product of manufacture, e.g., a pad, patch or dressing, capable delivering hydrogen, metastable hydrogen peroxide and oxygen locally to an area in need thereof, and methods of making and using the product of manufacture, wherein the area in need thereof includes any condition (including for cosmetic purposes), injuries or inflammations (e.g., bruises or contusions), infections or wounds that would benefit by the application of (or exposure to) hydrogen, metastable hydrogen peroxide and/or oxygen. The major concept is to use water electrolysis for hydrogen generation inside a water-absorbent hydrogel, e.g., such as a hyaluronic acid, where the hydrogel is implemented into (contained within) the product of manufacture, e.g., a pad, a band, a patch or a dressing.

In one embodiment, hyaluronic acid is the hydrogel or one of the hydrogels used. Hyaluronic acid is used for cosmetics which are safe for the skin, and hyaluronic acid-based hydrogels are at least about 75%, 80%, 85%, 90% or 95% hydrated (or are between about 70% to 100% hydrated), which makes them suitable for water-based electrolytes as used for and in the products of manufacture and methods as provided herein. We investigated the potential for the hydrogel to be used for hydrogen generation, as monitored from the pH changes, and demonstrated its effectiveness.

In alternative embodiments, provided are flexible hydrogel-based products of manufacture, e.g., fabricated as biologic pads, patches or dressings. In alternative embodiments, the products of manufacture are sterile for application on a wound or any surface, including internal surfaces, that would benefit from application of hydrogen, metastable hydrogen peroxide and/or oxygen, including skin or mucosa, or the surface of a wound, such as a traumatic wound (e.g., cuts or abrasions), inflammations, bruises, burns, or a pathology of the skin or a tissue, including e.g., an infection, a dermatitis, eczema (or any dermal autoimmune dysfunction) or cancer.

The products of manufacture comprise at least two electrodes (an anode and cathode, spaced apart) fabricated of any conductive material, e.g., a flexible conductive material, e.g., graphene or any metal, including e.g., platinum and gold, e.g., platinum or gold dispersed in a liquid solution, alternatively 3D printed or evaporated on a surface to act as an electrode. The electrodes are operatively linked to a power source, which can be a battery, which can be incorporated within the products of manufacture, or external to the products of manufacture.

In alternative embodiments, the products of manufacture are fabricated out of any flexible supportive material, e.g., polydimethylsiloxane (PDMS) (also called dimethylpolysiloxane or dimethicone), or any polymerized siloxane or polysiloxane (also called silicone). In alternative embodiments, the flexible conductive materials are deposited on or set into the flexible supportive material, e.g., the polymerized siloxane or polysiloxane, e.g., PDMS, support. Both graphene and PDMS are transparent for hydrogen atoms and thus will allow hydrogen penetration to the area of interest, e.g., an affected tissue or skin area upon which the products of manufacture are applied. In alternative embodiments, this helps diseased or wounded areas heal more quickly and effectively.

Hydrogels

In alternative embodiments, the products of manufacture are fabricated to comprise hydrated hydrogels, which can comprise any anionic glycosaminoglycan, e.g., an anionic non-sulfated glycosaminoglycan, e.g., hyaluronic acid, also called hyaluronan. In alternative embodiments, hydrogels used to practice products of manufacture as provided herein can be formed of synthetic polymers, such as crosslinked polyethylene oxide, crosslinked poly(2-acrylamido-2-methyl-1-propanesulfonic acid) or poly AMPS, crosslinked polyvinylpyrrolidone, polyvinyl alcohol, sodium polyacrylates, acrylate polymers and copolymers with abundant hydrophilic groups, or a natural polymer such as agarose, methylcellulose or hyaluronic acid, and the like.

An exemplary hyaluronic acid used to practice methods and products of manufacture (e.g., in a pad, patch or dressing) as provided herein can have the following formula, wherein in alternative embodiments "n" can be anywhere between 1 and about 1,000:

Power Source

In alternative embodiments, the products of manufacture are fabricated to provide a current to run through a hydrogel to generate hydrogen (and metastable hydrogen peroxide and oxygen) by electrolysis of water. In alternative embodiments, the power source is external or internal (e.g., contained within or upon) the product of manufacture.

In alternative embodiments, if the power source is internal (e.g., contained within or upon) or part of the product of manufacture, the power source can be a battery, e.g., a microbattery, which can be in the micro-ampere (μ-ampere, or μA) or milli-ampere range, e.g., from between about 1 μA to $10^3$ μA.

In alternative embodiments, if the power source is internal to or part of the products of manufacture, the power source further comprises: a switch for turning the power on and off, a rheostat for modulating the amount of power delivered to the electrodes, and/or a display for showing or displaying to a user the amount of power generated and/or the amount of time power has been generated.

Wound or Tissue Dressings, Patches or Pads

In alternative embodiments, the products of manufacture are fabricated as and used for application to a skin or tissue surface as a covering, e.g., a wound covering, or bandage, dressing, patch or pad. In these embodiments, the products of manufacture as provided herein can be sterile, or at least the hydrogel to be in contact with the skin or tissue of interest can be sterile.

In alternative embodiments, the hydrogel component of a product of manufacture is supported by a flexible (optionally also elastic or stretchable) supportive material, as discussed above, and the hydrogel can completely or partially encased in or supported by the flexible supportive material. In alternative embodiments, the hydrogel to be in contact with the skin or tissue of interest is not supported by the flexible supportive material. In alternative embodiments, the flexible supportive material comprises an acrylic, a nylon or a polyester.

In alternative embodiments, the hydrogel or flexible supportive material to be adjacent or set upon the tissue of interest (e.g., a wound) is covered by a removable cover or backing, which is only removed before the hydrogel or flexible supportive material is to be set upon the tissue of interest (e.g., a wound).

In alternative embodiments, the hydrogel or flexible supportive material can also comprise adhesives (e.g., acrylates such as methacrylates, epoxy diacrylates or vinyl resins) for adhering to a skin or tissue of interest. Alternatively, the products of manufacture can be held in proximity to, or against, a tissue using an external bandage or wrap, e.g., an elastic or Ace bandage, or elastic therapeutic tape.

In alternative embodiments, the products of manufacture are fabricated using methods of manufacture and/or components as described in U.S. Pat. Nos. 9,566,430; 8,475,689; 7,480,530; 7,479,133; 7,477,941; 7,477,940; 7,477,939; 7,476,222; 7,476,221; 6,622,037; and/or 6,289,241.

In alternative embodiments, the products of manufacture further comprise a therapeutic compound, for example, an antibiotic, a drug or any biologically active compound, e.g., and compound having a therapeutic or anti-inflammatory activity. In alternative embodiments, the products of manufacture further comprise a lubricant, an anesthetic or an analgesic.

Kits

Also provided are kits comprising products of manufacture as provided herein, optionally with instructions for use.

In alternative embodiments, the kits and methods for using products of manufacture optionally also comprise software for downloading or loading onto a phone, a computer or an equivalent device data detected from operation of the products of manufacture, e.g., allowing for or enabling interaction between a user and the product of manufacture, and data transmission from the product of manufacture to the phone, computer or equivalent device, and presentation of the transmitted data to the user, wherein optionally the software is packaged as an app for the phone or equivalent device.

In alternative embodiments, an exemplary "app" (application) will be designed with the Graphical User Interface (GUI) to see the impedance values of the tissue area of interest to which the current is applied.

Methods of Treatment

In alternative embodiments, the products of manufacture are used to provide a therapeutically effective amount of hydrogen to a tissue or skin in need thereof. While the invention is not limited by any particular mechanism of action, in alternative embodiments the hydrogen administered to the tissue in need thereof by the products of manufacture as provided herein are effective by virtue of hydrogen's anti-oxidation properties, or effect on the tissue and cells, and/or by virtue of hydrogen's general ability to aid or accelerate healing processes.

In alternative embodiments, the products of manufacture are used for treating or ameliorating, or accelerating the healing of, or slowing the progression of, or lessening the symptoms of, a wound, a disease or a condition response to administration of a therapeutically effective amount of hydrogen, the method comprising: topically administering to a tissue or skin in need thereof a product of manufacture as provided herein.

In alternative embodiments, the products of manufacture are used to ameliorate, treat or heal a wound (e.g., accelerate the healing of a wound) or any condition, disease or infection that would benefit by administration of a therapeutically effective amount of hydrogen, including wounds, granulomas, ulcers (e.g., diabetic ulcers), burns, skin conditions such as dermatitis or eczema, or a cancer such as a melanoma or a carcinoma. In alternative embodiments, the skin condition is an autoimmune disease or condition of the skin or mucosa such as: alopecia, urticaria, pemphigoid (e.g., bullous pemphigoid or cicatricial pemphigoid), pemphigus (e.g., pemphigus vulgaris), lupus eythematosus, erythema (e.g., erythema nodosum) lichen planus or lichen sclerosus, psoriasis, scleroderma, or vitiligo.

In alternative embodiments, the amount of time the product of manufacture is applied to the skin or tissue in need thereof depends on the severity and/or nature of the wound, condition, disease or infection, and the age, general health and condition of the individual being treated. For example, in alternative embodiment, a product of manufacture is applied to a skin or tissue in need thereof for between about 5 minutes to about 10 hours, or for between about 30 minutes to 8 hours, or for between about 1 hour and 7 hours, or for between about 2 hours and 6 hours.

In alternative embodiments, the individual being treated is a human or an animal, e.g., a laboratory, domestic or farm animal.

The invention will be further described with reference to the examples described herein; however, it is to be understood that the invention is not limited to such examples.

EXAMPLES

Example 1: Treatment of Wounds by Inducing Hydrogen Release into the Wound by Generating a Current Through a Topically Applied Hydrogel This example describes use of an exemplary device and methods as provided herein to topically apply hydrogen (and metastable hydrogen peroxide and oxygen) to a tissue of interest, e.g., a skin, e.g., to treat a skin wound or enhance the healing of a skin wound.

In water electrolysis, water is split into hydrogen and oxygen ions upon applying an electrical field. Based on water electrolysis, a hydrogel that is solidified in water releases hydrogen ions and oxygen ions to (onto or approximate to) a tissue of interest, e.g., into or on a wounded area.

In alternative embodiments, a hydrogel used in an exemplary device and methods as provided herein (e.g., a hyaluronic acid) is easy to manufacture, carry, fabricate in to a product of manufacture (e.g., a pad, patch or dressing). In alternative embodiments, a hydrogel used in an exemplary device and methods as provided herein (e.g., a hyaluronic acid) is formed chemically and has over 90% of water in the structure.

Any hydrogel, e.g., any hydrogel used for a biological application such as for drug delivery and cosmetic purposes, can be used. This study used hyaluronic acid, which is used widely for cosmetic purposes and proven to be a safe material. Also, it absorbs water at around 100 to 300 times of its weight depending on the concentration. By applying an electrical current across the product of manufacture (e.g., a pad, patch or dressing), electrolysis of water takes place inside the hydrogel.

In this study, 1% (1 g of hyaluronic acid and 99 g of water), 2% (2 g of hyaluronic acid and of 98 g water), and 4% (4 g of hyaluronic and 96 g of water) concentrations of the hydrogels are prepared.

An exemplary configuration of hyaluronic acid hydrogel is shown in FIG. 1. After preparing each hydrogel, graphite (also called graphene) or platinum electrodes are connected to 9V DC potential are used to generate hydrogen, metastable hydrogen peroxide and oxygen in the hydrogel. In alternative embodiments, any DC power source can be used as long as the power is sufficient to cause a hydrolysis reaction, i.e., for splitting water into hydrogen and oxygen, so in under typical ambient conditions the minimum DC voltage is at 1.23 volts.

In one embodiment, the distance between anode and cathode is kept at approximately 4 cm, which creates a constant electric field effect on the hydrogel. In alternative embodiments, the distance between anode and cathode is between about 0.5 to 10 cm, or between about 1 to 8 cm, or between about 1 to 2 cm, or between about 2 to 6 cm.

Figure 2A:
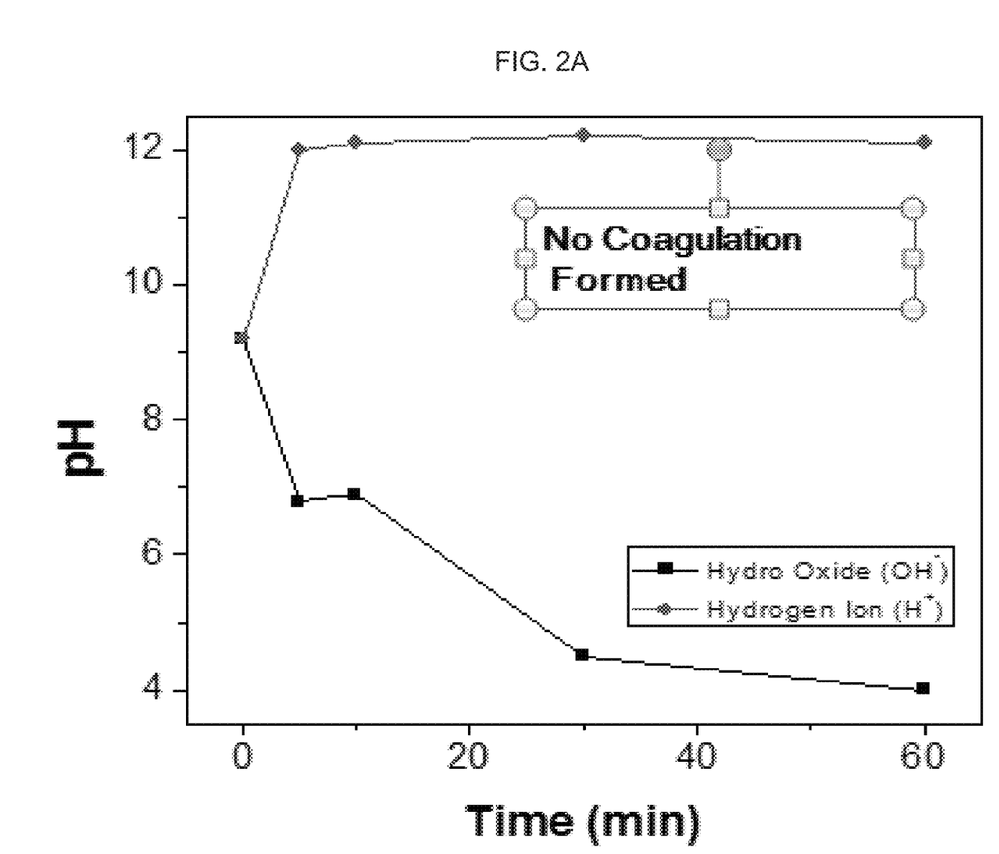
FIG. 2A graphically illustrates —OH⁻ and H+ ion formation over time when an electric field is applied to a 1% hyaluronic acid hydrogel form; after 5 minutes of applied voltage, pH increased to high values indicating hydrogen generation, noting that there was no hydrogel coagulation.
Figure 2B:
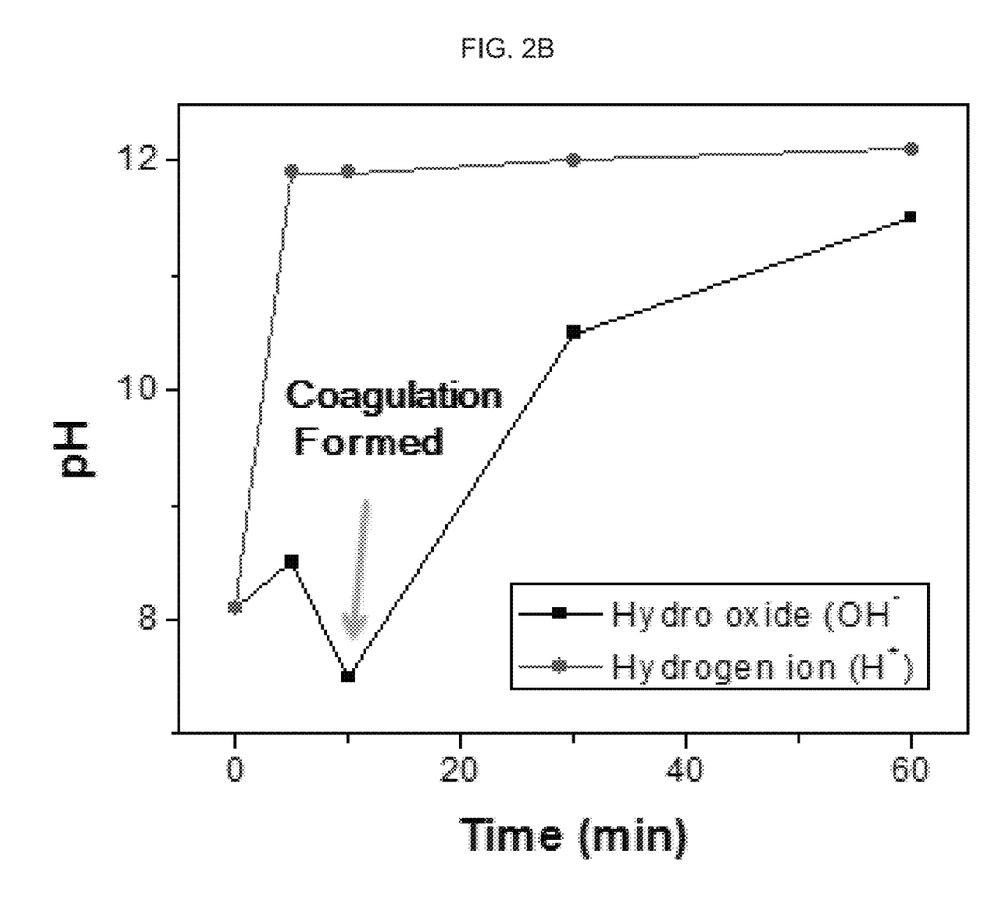
FIG. 2B graphically illustrates —OH⁻ and H+ ion formation over time when an electric field is applied to a 2% hyaluronic acid hydrogel form, showing hydrogel coagulation.
Figure 2C:
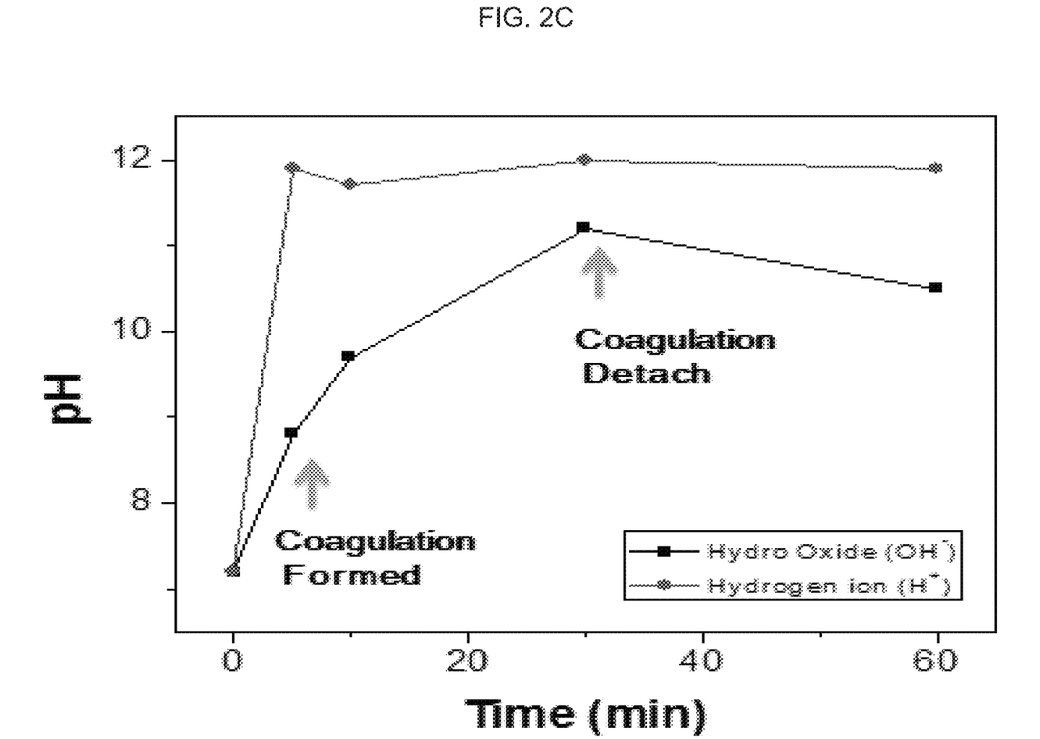
FIG. 2C graphically illustrates —OH⁻ and H+ ion formation over time when an electric field is applied to a 4% hyaluronic acid hydrogel form, showing that substantially most of) the polymer coagulation formed near the electrodes, and as described in further detail, below, in Example 1.
Figure 3:
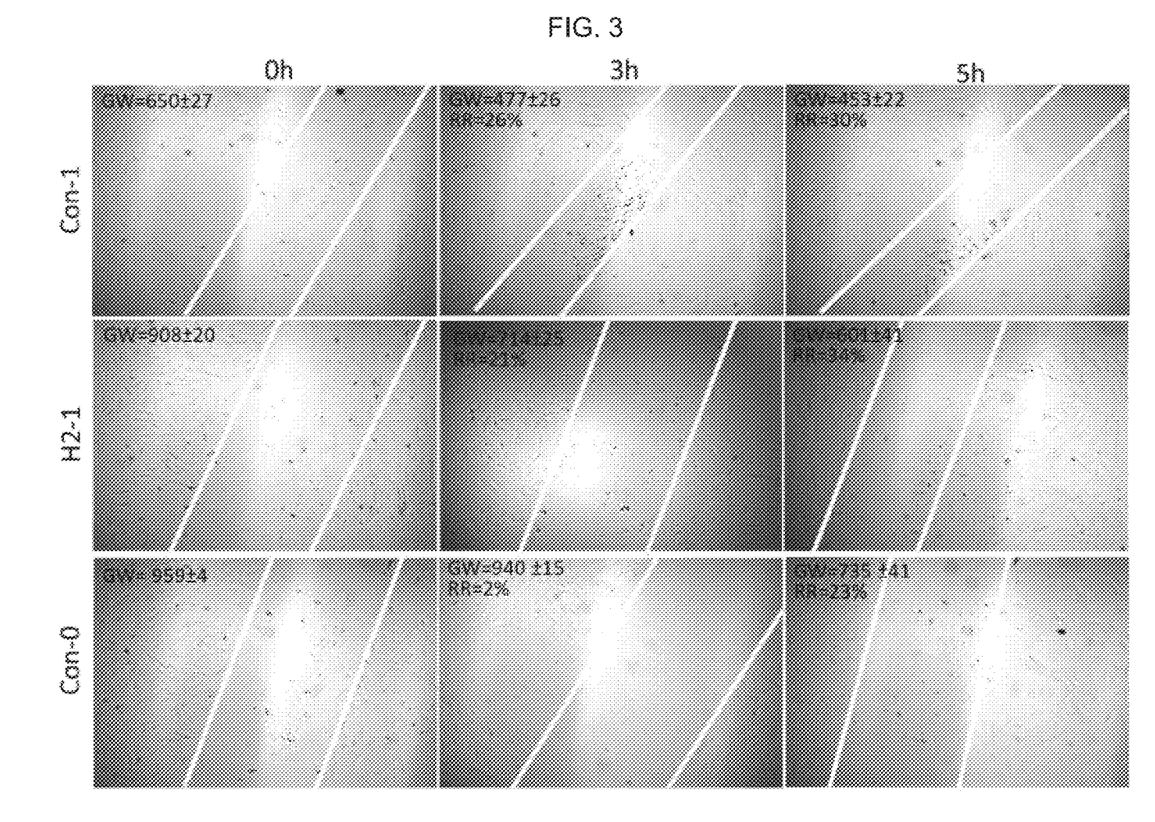
FIG. 3 illustrates an image of a migration test on three different treatments (at zero time point, and after 3 and 5 hours) using an exemplary product of manufacture as provided herein, where Con-1 indicates a skin patch without generating hydrogen; H2-1 indicates a skin patch with generating hydrogen; and Con-0 indicates the results with no patch. The data shows an increase in collagen in the H2-1 sample as compared with the Con-1 (patch not generating hydrogen). For the migration test, the H2 group can boost the migration earlier than Con-0 sample (no patch).
Figure 4:
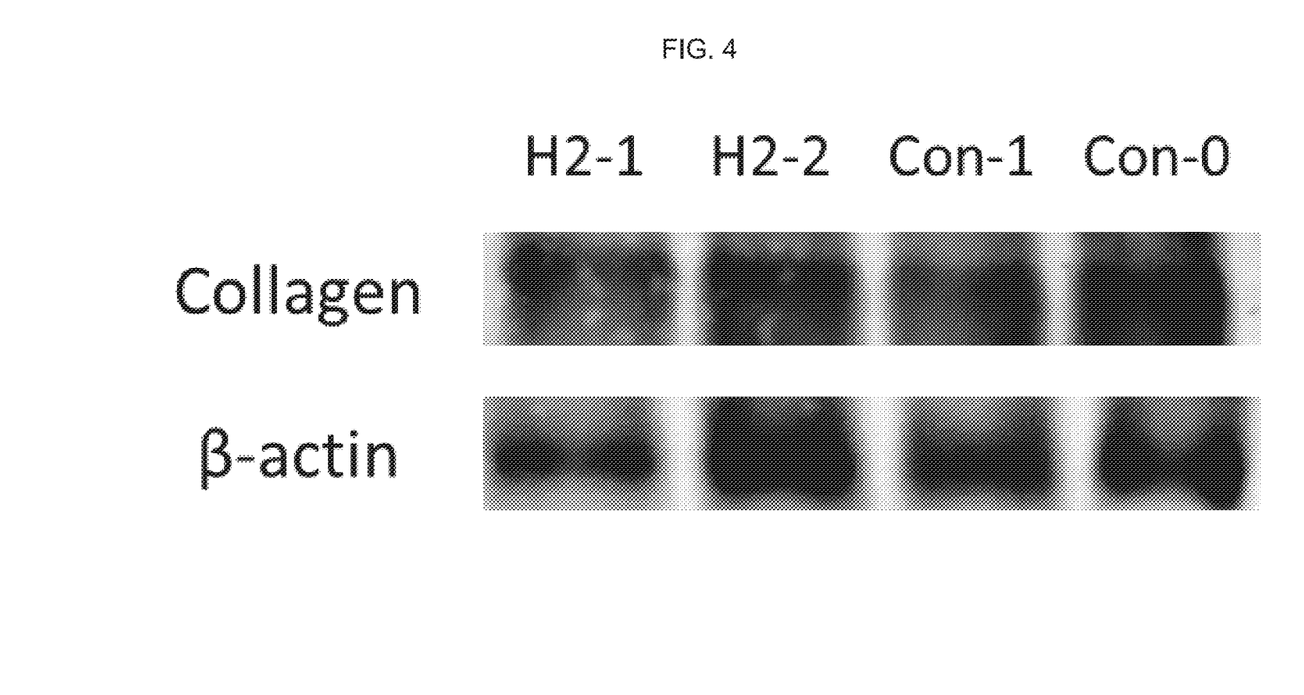
FIG. 4 illustrates an image of a Western Blot result for the collagen expression generated in the migration test of FIG. 3, where the cells were collected after 20 hours, where β-actin is a positive control.
Figure 5:
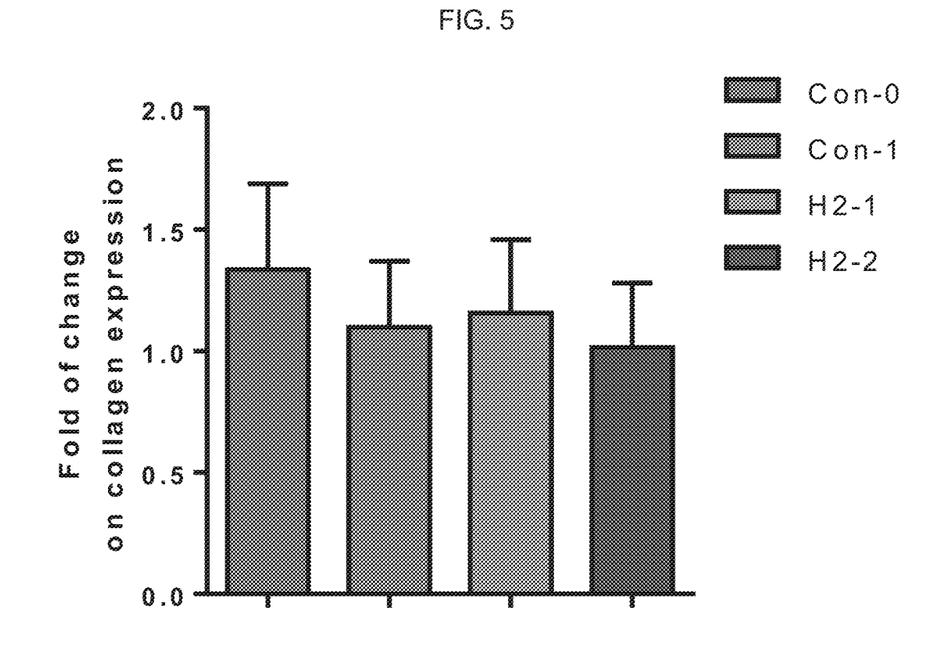
FIG. 5 graphically illustrates the fold change on collagen expression of the migration test illustrated in FIG. 3 and FIG. 4.
Figure 6:
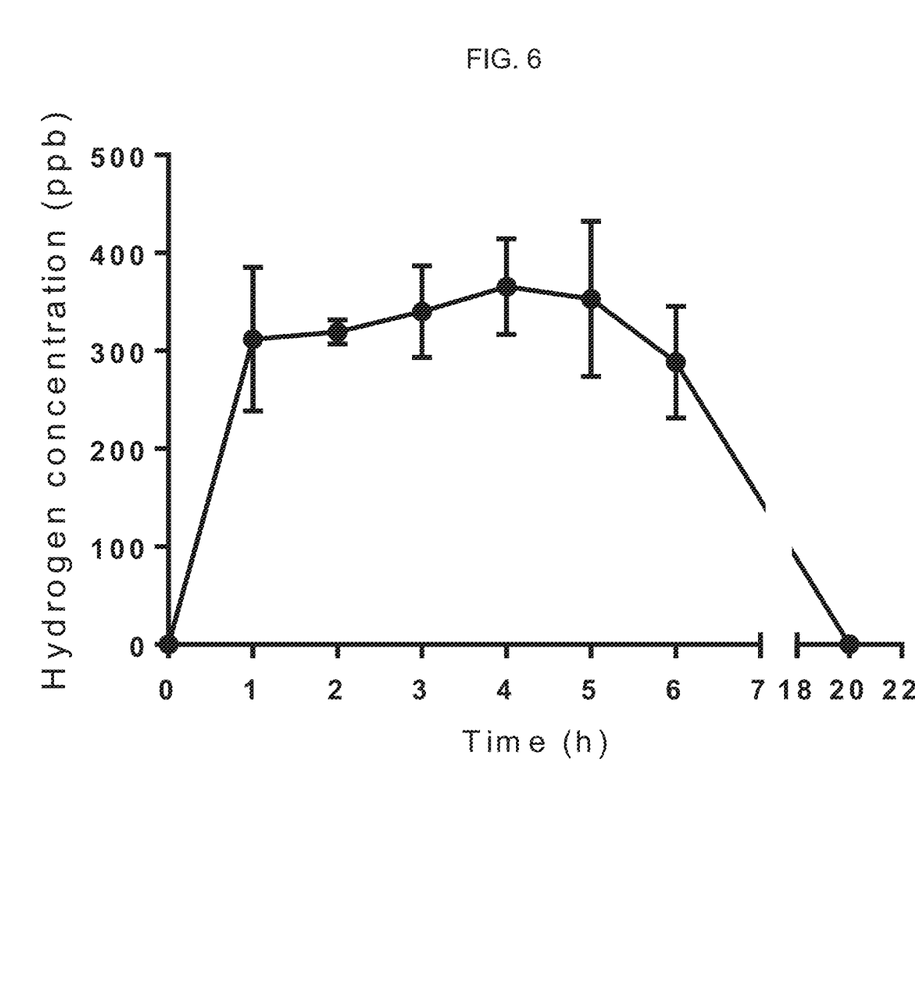
FIG. 6 graphically illustrates the change in hydrogen concentration (ppb) over time as generated by an exemplary product of manufacture as provided herein, a skin patch, the data showing that the patch can generate significant amounts (therapeutically effective amounts) of hydrogen release for about 6 hours.

Once the electrical system is connected, hydrogel pH is measured at the cathode and anode sides. The pH is measured every 5 minutes up to one hour to confirm hydrogen generation. The voltage is turned off after one hour and changes in pH values are continued to be monitored.
Results:
1% of Hyaluronic Acid Hydrogel When the electric field is applied to hyaluronic acid, hydrogen, metastable hydrogen peroxide and oxygen are generated. For 1% of hyaluronic acid, hydrogel forms Sol (solid particles in a continuous liquid medium) type structure instead of gel type, as demonstrated by lower viscosity and less chemical chains intermixture with water. After 5 minutes of applied voltage, pH increased to high values indicating hydrogen generation as shown in FIG. 2A.
2% of the Hyaluronic Acid Hydrogel 2% of hydrogel shows coagulation formed in 10 min which is little slower than for 1% of the hydrogel. The reason is that the viscosity of hydrogel is higher than 1% hydrogel which results in a gel-type structure and increased overall pH of the hydrogel, though the slightly lower increase is observed for OH generation. Even though gel of chemical chain formed, coagulation is shown in FIG. 2B. Once coagulation is formed, oxygen is locally trapped near the electrodes in the polymer while hydrogen continues to dissolve in the polymer. However, after 30 min, coagulation is detached because it is too heavy to hold on to the electrode. Once coagulation of hydrogel is detached, pH is decreased because coagulation of hydrogel did not hinder generate oxygen.
4% of the Hyaluronic Acid Hydrogel This type of hydrogel has a very high viscosity. Therefore, in contrast to other samples, a lot of (substantially most of) the polymer coagulation formed near the electrodes, see FIG. 2C.

CONCLUSION

Figure 1A:
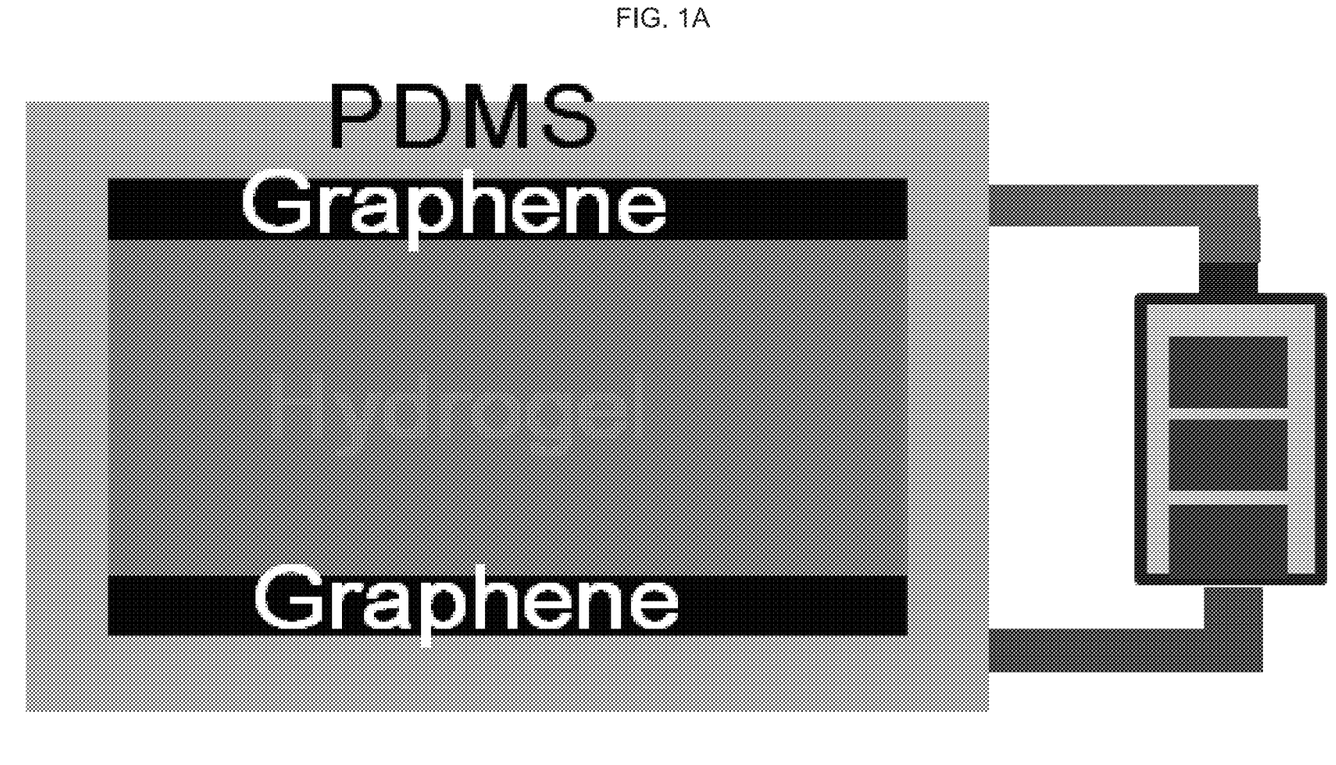
FIG. 1A illustrates a schematic of an exemplary products of manufacture as provided herein, where the power source may or may not be an integral part of the products of manufacture.
Figure 1B:
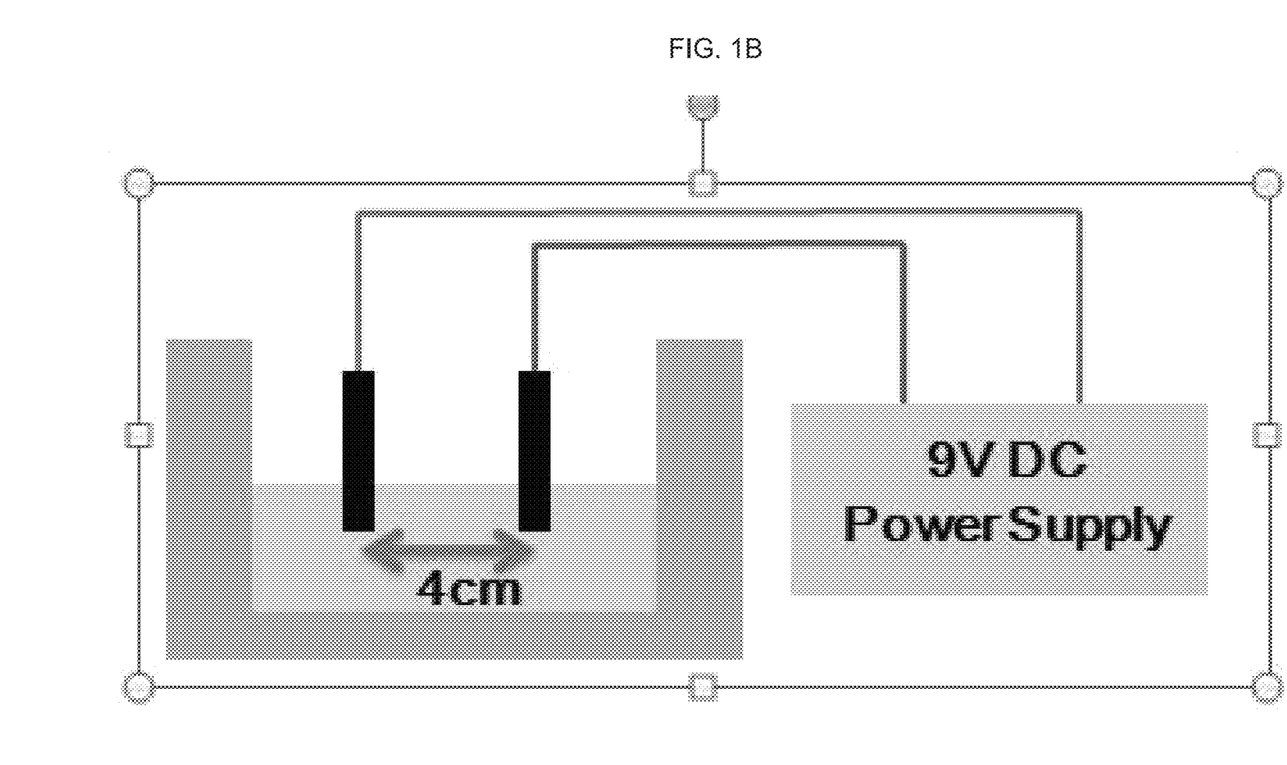
FIG. 1B illustrates a schematic of an exemplary product of manufacture applied to a skin surface, where the power source is external to the product of manufacture, and the DC current is applied through wires connecting the product of manufacture and the external power source, e.g., a battery, and as described in further detail, below, in Example 1.

These results demonstrate the feasibility of this new approach for locally generating hydrogen (and metastable hydrogen peroxide and oxygen) in a hydrogel-filled structure, e.g., as the exemplary embodiments illustrated in FIGS. 1A and 1B. These results demonstrate the therapeutic efficacy of products of manufacture as provided herein treating or ameliorating, or accelerating the healing of, or slowing the progression of, or lessening the symptoms of, a wound, a disease or a condition response to administration of a therapeutically effective amount of hydrogen, metastable hydrogen peroxide and/or oxygen.

REFERENCES

[1] Nakao, A., et al. (2010). Effectiveness of Hydrogen Rich Water on Antioxidant Status of Subjects with Potential Metabolic Syndrome—An Open Label Pilot Study. *Journal of Clinical Biochemistry and Nutrition,* 46(2), 140-149. doi:10.3164/jcbn.09-100
[2] Li, L., Wang, et al. (2015). A Nanostructured Conductive Hydrogels-Based Biosensor Platform for Human Metabolite Detection. *Nano Letters,* 15(2), 1146-1151. doi:10.1021/nl504217p
[3] Peppas, N. A., & Blarcom, D. S. (2016). Hydrogel-based biosensors and sensing devices for drug delivery. *Journal of Controlled Release,* 240, 142-150. doi:10.1016/j.jconrel.2015.11.022
[4] Li, J., & Mooney, D. J. (2016). Designing hydrogels for controlled drug delivery. *Nature Reviews Materials,* 1(12), 16071. doi:10.1038/natrevmats.2016.71
[5] Winkless, L. (2016). Graphene quantum dots for multiple biomedical applications. *Materials Today,* 19(1), 4. doi:10.1016/j.mattod.2015.11.024

Any of the above aspects and embodiments can be combined with any other aspect or embodiment as disclosed here in the Summary and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention.

A number of embodiments of the invention have been described. Nevertheless, it can be understood that various modifications may be made without departing from the spirit and scope of the invention. Accordingly, other embodiments are within the scope of the following claims.

What is claimed is:

1. A product of manufacture capable of generating hydrogen, the product of manufacture comprising:
    (a) a hydrated hydrogel, wherein the hydrogel comprises about 1% (w/w) hyaluronic acid, and
    (b) at least one cathode electrode and at least one anode electrode implanted within or upon the hydrogel, wherein the cathode and the anode electrode are comprised of graphene and are spaced sufficiently apart to generate an electrical current in the hydrogel sufficient to cause a hydrolysis reaction in the hydrogel,
    wherein the product of manufacture is fabricated in the form of a pad, a dressing, or a patch.

2. The product of manufacture of claim 1, wherein the hydrogel comprises a crosslinked polyethylene oxide, a crosslinked poly (2-acrylamido-2-methyl-1-propanesulfonic acid) or poly AMPS, a crosslinked polyvinylpyrrolidone, a polyvinyl alcohol, a sodium polyacrylate, an acrylate polymer, an agarose or a cellulose, optionally a methylcellulose.

3. The product of manufacture of claim 1, wherein the cathode and the anode electrodes are spaced 0.5 to 3 cm, apart; or the cathode and the anode electrodes comprise a conductive material.

4. The product of manufacture of claim 1, comprising a power source operatively linked to the at least one cathode electrode and at least one anode electrode.

5. The product of manufacture of claim 1, further comprising a flexible supportive material, and optionally the hydrogel is completely or partially encased in or is supported by the flexible supportive material.

6. The product of manufacture of claim 1, wherein the hydrogel is 75%, 80% or 85% by weight hydrated.

7. The product of manufacture of claim 6, wherein the hydrogel is 85%, 90% or 95% hydrated, or is 100% hydrated.

8. The product of manufacture of claim 3, wherein the conductive material further comprises a metal.

9. The product of manufacture of claim 4, wherein the power source comprises a battery.

10. The product of manufacture of claim 5, wherein the flexible supportive material comprises an acrylic, a nylon or a polyester.

11. The product of manufacture of claim 1, wherein the product of manufacture is further capable of generating metastable hydrogen peroxide and/or oxygen.

\* \* \* \* \*